(12) United States Patent
Wakazono

(10) Patent No.: US 7,289,280 B2
(45) Date of Patent: Oct. 30, 2007

(54) ZOOM LENS AND IMAGING SYSTEM

(75) Inventor: Tsuyoshi Wakazono, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 11/552,541

(22) Filed: Oct. 25, 2006

(65) Prior Publication Data

US 2007/0109665 A1 May 17, 2007

(30) Foreign Application Priority Data

Nov. 15, 2005 (JP) ............................. 2005-329888

(51) Int. Cl.
*G02B 9/34* (2006.01)
(52) U.S. Cl. ....................... 359/779; 359/772
(58) Field of Classification Search ................ 359/779, 359/687, 686, 771, 772, 774, 775
See application file for complete search history.

(56) References Cited

U.S. PATENT DOCUMENTS 6,891,680 B2 * 5/2005 Sato ........................... 359/687

7,057,827 B2   6/2006 Wakazono

FOREIGN PATENT DOCUMENTS

JP   2005-292524 A   10/2005

* cited by examiner

*Primary Examiner*—Tim Thompson
(74) *Attorney, Agent, or Firm*—Canon USA Inc. IP Division

(57) ABSTRACT

At least one exemplary embodiment is directed to a zoom lens which includes, in order from an object side to an image side, a first lens unit having positive refractive power and is stationary during zooming, a second lens unit configured to move to perform zooming, a third lens unit configured to move to compensate for variation of an image plane caused by zooming, and a fourth lens unit having positive refractive power and is also stationary during zooming. The first lens unit includes, in order from the object side to an image side, a first lens subunit having positive refractive power and is stationary during focusing, a second lens subunit having positive refractive power, and a third lens subunit having negative refractive power and is also stationary during focusing. The second lens subunit moves along an optical axis during focusing.

20 Claims, 9 Drawing Sheets

ZOOM LENS AND IMAGING SYSTEM

BACKGROUND OF THE INVENTION

1. Field of the Invention

The present invention relates to a zoom lens that can be used in imaging apparatuses.

2. Description of the Related Art

Among the zoom lenses, especially, high-power telephoto zoom lenses, each of which has an angle of view of 2 degrees or less and a variable power ratio of 5.5 to 13.4 at a telephoto end, are discussed in Japanese Patent Application Laid-Open No. 2005-292524.

In a case where images of animals and birds are taken at long range out-of-doors for television nature programs, camera operators demand zoom lenses having high variable power ratios (for example, a large magnification of 5 or more and an angle of view of 2 degrees or less) and high optical performance. Also, in such a case, an operator often carries a camera over his shoulder while using the camera. Thus, more compact and lightweight and highly portable zoom lenses are demanded.

SUMMARY OF THE INVENTION

At least one exemplary embodiment is directed to a zoom lens that can be used in imaging apparatuses (e.g., a digital still camera, a television camera, a video camera and other imaging apparatus as known by one of ordinary skill in the relevant arts). At least one further exemplary embodiment of the present invention is directed to a compact, lightweight, high-power, and high-performance telephoto zoom lens enabled to suppress variation in various aberration with an object distance at a telephoto end by appropriately providing a first lens unit.

According to an aspect of the present invention, a zoom lens includes first, second, third, and fourth lens units arranged in order from an object side to an image side, where the first lens unit is stationary during zooming and has a positive refractive power, the second lens unit is configured to move to perform zooming, the third lens unit is configured to move to compensate for variation of an image plane caused by zooming, and the fourth lens unit is stationary during zooming and has a positive refractive power. The first lens unit includes, first, second, and third lens subunits arranged in order from an object side to an image side, where the first lens subunit is stationary during focusing and has positive refractive power, the second lens subunit has a positive refractive power, and the third lens subunit is stationary during focusing and has a negative refractive power. The second lens subunit moves along an optical axis during focusing.

According to another aspect of the present invention, the zoom lens is configured to satisfy the following conditions:

$$-4.5 < f1c/f1ab < -0.8, \text{ and}$$

$$1 < f1b/f1a < 3.0$$

where f1$a$ designates a focal length of the first lens subunit, f1$b$ represents a focal length of the second lens subunit, f1$c$ denotes a focal length of the third lens subunit, and f1$ab$ designates a combined focal length of the first lens subunit and the second lens subunit when focusing is performed at an infinite object distance.

According to yet another aspect of the present invention, the zoom lens is configured such that the second lens subunit has at least one positive lens element and at least one negative lens element whose object-side lens surface is convex toward an image side.

According to yet another aspect of the present invention, the zoom lens is configured to satisfy the following condition:

$$vbp - vbn > 30,$$

where vbp designates an average value of Abbe numbers of positive lens elements included in the second lens subunit, and vbn represents an average value of Abbe numbers of negative lens elements included in the second lens subunit.

According to yet another aspect of the present invention, the zoom lens is configured to satisfy the following condition:

$$Nbn - Nbp > 0.1,$$

where Nbp designates an average value of refractive indices of positive lens elements included in the second lens subunit, and Nbn represents an average value of refractive indices of negative lens elements included in the second lens subunit.

According to yet another aspect of the present invention, the zoom lens is configured to satisfy the following condition:

$$0.2 < f1/fT < 0.8,$$

where f1 designates a focal length of the first lens unit, and fT represents a focal length of the zoom lens at a telephoto end.

According to yet another aspect of the present invention, the zoom lens is configured to satisfy the following conditions:

$$30 < fT/Ld, \text{ and}$$

$$5 < Z$$

where Ld designates a diagonal length of an effective image plane formed by the zoom lens, and Z denotes a zoom ratio of the zoom lens.

According to yet another aspect of the present invention, the zoom lens is configured to satisfy the following condition:

$$0.6 < K < 1.3$$

where K designates a ratio of a distance between a rear focal position of the first lens subunit and a rear focal position of the first lens unit to a focal length of the first lens unit.

According to yet another aspect of the present invention, the zoom lens is configured such that the first lens subunit includes at least two positive lens elements and at least one negative lens element, and that the zoom lens satisfies the following condition:

$$vap - van > 30$$

where vap designates an average value of Abbe numbers of the at least two positive lens elements included in the first lens subunit, and van represents an average value of Abbe number of the at least one negative lens element included in the first lens subunit.

According to yet another aspect of the present invention, the zoom lens is configured such that the third lens subunit includes at least one positive lens element and at least one negative lens element, and that the zoom lens satisfies the following condition:

$$vcn - vcp > 5$$

where vcp designates an average value of Abbe numbers of the at least one positive lens element included in the third lens subunit, and vcn represents an average value of Abbe numbers of the at least one negative lens element included in the third lens subunit.

According to yet another aspect of the present invention, the zoom lens is configured to include the first, second, third, and fourth lens units, and a stop disposed between the third lens unit and the fourth lens unit.

According to yet another aspect of the present invention, the zoom lens is configured to include a focal length conversion optical system insertable into and removable from a space formed in the fourth lens unit.

According to yet another aspect of the present invention, an imaging system includes the zoom lens and an imaging apparatus configured to mount the zoom lens thereon.

Thus, according to an aspect of the present invention, the first lens unit includes three lens subunits arranged in order from an object side to an image side, where a first lens subunit has a positive refractive power, a second lens subunit has a positive refractive power, and a third lens subunit has a negative refractive power. Focusing is performed by the second lens subunit. Also, various condition expressions are appropriately set. Consequently, a compact, lightweight, high-power, and high-performance telephoto zoom lens can be implemented.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate some exemplary embodiments and features of the invention and, together with the description, serve to explain some of the principles of the invention.

DETAILED DESCRIPTION OF THE EMBODIMENTS

Figure 1:
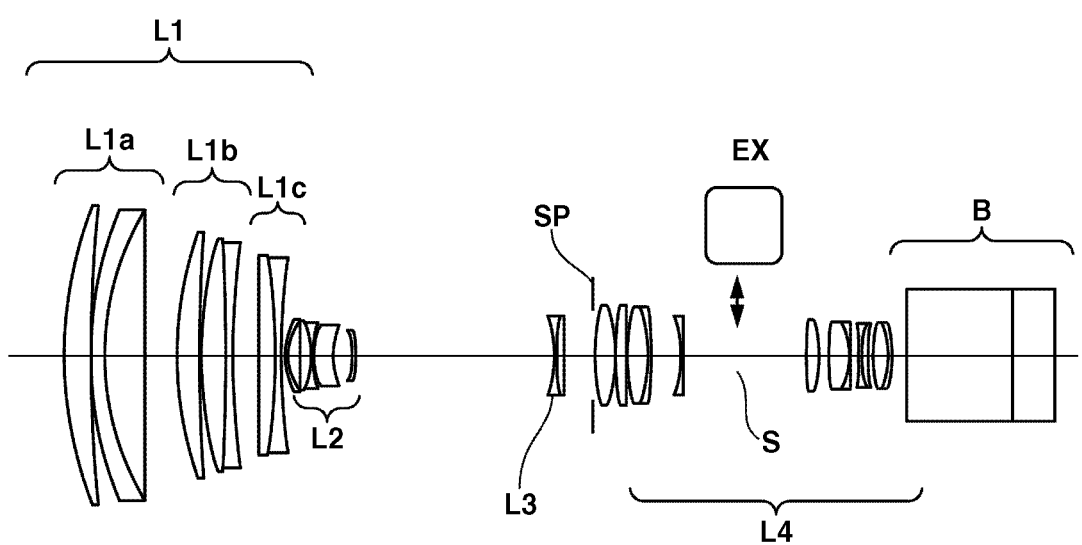
FIG. 1 is a cross-sectional view of a zoom lens according to an exemplary embodiment (numerical example 1) of the present invention at a wide-angle end.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of the lens elements and their materials.

In all of the examples illustrated and discussed herein any specific values, for example the zoom ratio and F number, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Note that herein when referring to correcting or corrections of an error (e.g., an aberration), a reduction of the error and/or a correction of the error is intended.

Various exemplary embodiments of the present invention will be described in detail below with reference to the drawings.

An exemplary embodiment is directed to a telephoto zoom lens having an angle of view of 2.0 degrees or less at a telephoto end, a variable power ratio of about 5 or more, and an aperture ratio of 3.0 or less at a wide-angle end.

The zoom lens according to the present exemplary embodiment includes, in order from an object side to an image side, a first lens unit L1 that is stationary during zooming and has positive refractive power, a second lens unit L2 that is movable for zooming and has negative refractive power, a stop SP, a third lens unit L3 that is movable for compensating for variation of an image plane caused by zooming, and a fourth lens unit L4 that is stationary during zooming and has positive refractive power.

The first lens unit L1 includes, in order from the object side to an image side, a first lens subunit L1$a$ that is stationary during focusing and has positive refractive power, a second lens subunit L1$b$ that has positive refractive power, and a third lens subunit L1$c$ that is stationary during focusing and has negative refractive power. The second lens subunit L1$b$ moves along an optical axis during focusing.

Also, the zoom lens can meet the following conditions:

$$-4.5 < f1c/f1ab < -0.8 \quad (1)$$

$$0.1 < f1b/f1a < 3.0 \quad (2)$$

where f1$a$ designates a focal length of the first lens subunit L1$a$, f1$b$ represents a focal length of the second lens subunit L1$b$, f1$c$ denotes a focal length of the third lens subunit L1$c$, and f1$ab$ designates a combined focal length of the first lens subunit L1$a$ and the second lens subunit L1$b$ when focusing is performed at an infinite object distance.

Also, the second lens subunit L1$b$ has at least one positive lens element and at least one negative lens element whose object-side lens surface is convex toward an image side.

Additionally, the zoom lens can meet the following condition:

$$\nu bp - \nu bn > 30 \quad (3)$$

where vbp designates an average value of Abbe numbers of positive lens elements included in the second lens subunit L1b, and vbn represents an average value of Abbe numbers of negative lens elements included in the second lens subunit L1b.

Also, the zoom lens can meet the following condition:

$$Nbn - Nbp > 0.1 \quad (4)$$

where Nbp designates an average value of refractive indices of positive lens elements included in the second lens subunit L1b, and Nbn represents an average value of refractive indices of negative lens elements included in the second lens subunit L1b.

Also, the zoom lens can meet the following condition:

$$0.2 < f1/fT < 0.8 \quad (5)$$

where f1 designates a focal length of the first lens unit L1, and fT represents a focal length of the entire zoom lens at a telephoto end.

Also, the zoom lens can meet the following condition:

$$30 < fT/Ld \quad (6)$$

$$5 < Z \quad (7)$$

where Ld designates a diagonal length of an effective image plane formed by the zoom lens, and Z denotes a zoom ratio of the zoom lens.

Also, the zoom lens can meet the following condition:

$$0.6 < K < 1.3 \quad (8)$$

where K designates a ratio of a distance between a rear focal position of the first lens subunit L1a and a rear focal position of the first lens unit L1 to a focal length of the first lens unit L1.

In a case where the first lens subunit L1a includes at least two positive lens elements and at least one negative lens element, the zoom lens can satisfy the following condition:

$$\nu ap - \nu an > 30 \quad (9)$$

where vap designates an average value of Abbe numbers of positive lens elements included in the first lens subunit L1a, and van represents an average value of Abbe numbers of negative lens elements included in the first lens subunit L1a.

Also, in a case where the third lens subunit L1c includes at least one positive lens element and at least one negative lens element, the zoom lens can satisfy the following condition:

$$\nu cn - \nu cp > 5 \quad (10)$$

where vcp designates an average value of Abbe numbers of positive lens elements included in the third lens subunit L1c, and vcn represents an average value of Abbe numbers of negative lens elements included in the third lens subunit L1c.

Figure 7:
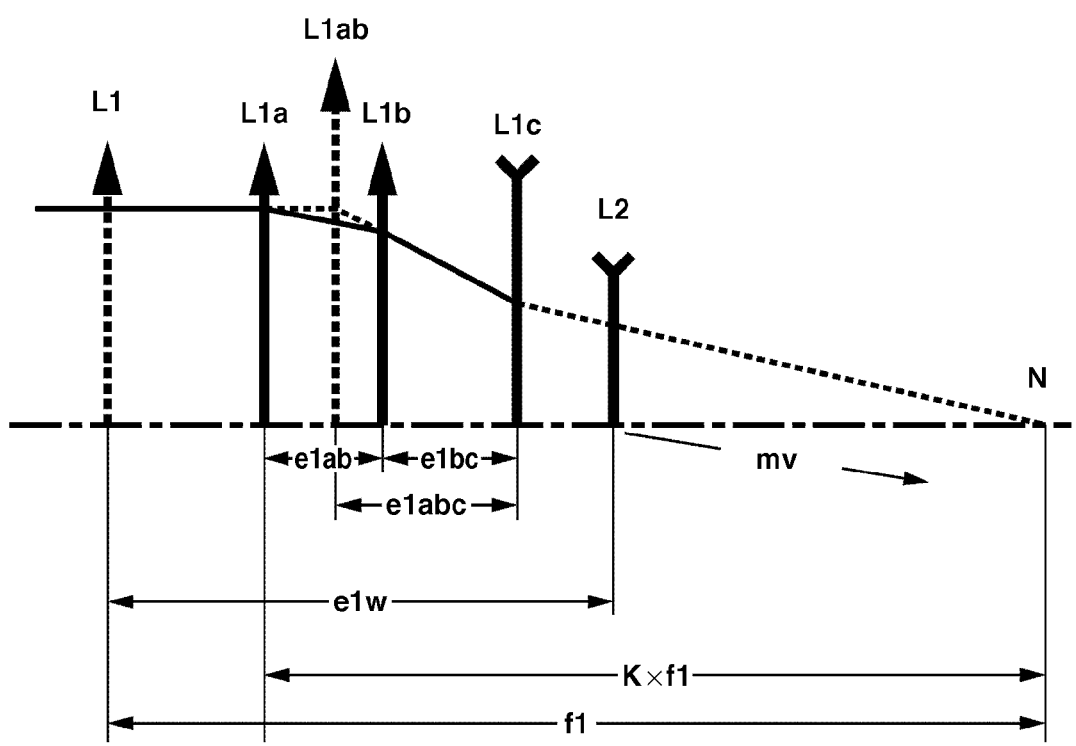
FIG. 7 is a schematic view of the basic configuration of a first lens unit and a second lens unit of the zoom lens according to the exemplary embodiment of the present invention.

FIG. 7 is a conceptual view of the basic configuration of the first lens unit L1 and the second lens unit L2 of the zoom lens according to the exemplary embodiment of the present invention at the wide-angle end. The first lens unit L1 is stationary during zooming, and has positive refractive power. The second lens unit L2 moves (mv) toward an image plane side when zooming is performed. The rear focal point N of the first lens unit L1 is an object point of the second lens unit L2. The first lens unit L1 includes, in order from an object side to the image side (image plane side), the first lens subunit L1a that is stationary during focusing, the second lens subunit L1b, and the third lens subunit L1c that is also stationary during focusing. Reference character f1 represents a focal length of the first lens unit L1, reference character e1w designate a principal point interval between the first lens unit L1 and the second lens unit L2 at the wide-angle end, and reference character mv represents an amount of movement of the second lens unit L2 from the wide-angle end to the telephoto end. Reference character K denotes a ratio of a distance between the first lens subunit L1a and the object point N to the focal length f1. Reference character e1ab represents a principal point interval between the first lens subunit L1a and the second lens subunit L1b. Reference character e1bc denotes a principal point interval between the second lens subunit L1b and the third lens subunit L1c.

Reference character e1abc designates a principal point interval between a lens unit L1ab, which is obtained by combining the first lens subunit L1a and the second lens subunit L1b, and the third lens subunit L1c when focusing is performed at an infinite object distance.

A telephoto ratio of the first lens unit L1 can be reduced by setting an optical arrangement of the first lens unit L1 to be in what is called a telephoto type configuration. Consequently, both of high-magnification and miniaturization are achieved by suppressing a physical interval between the first lens unit L1 and the second lens unit L2 while increasing the principal point interval e1w between the first lens unit L1 and the second lens unit L2 at the wide-angle end. Especially, in a case where the first lens unit L1 is divided into the first lens subunit L1a, the second lens subunit L1b, and the third lens subunit L1c, and where focusing is performed by the second lens subunit L1b, the interval between the lens subunits L1a and L1b and the interval between the lens subunits L1b and L1c change. This results in an increase in flexibility in correcting aberration. Also, aberration variation caused by focusing can be suppressed. High performance enhancement can be achieved. Let f1a, f1b, and f1c denote focal lengths of the first lens subunit L1a, the second lens subunit L1b, and the third lens subunit L1c, respectively. Also, let f1ab designate a focal length of the lens subunit L1ab when focusing is performed at an infinite object distance. Let β1b and β1c denote image-forming magnifications of the second lens subunit L1b and the third lens subunit L1c, respectively. Additionally, let K represent a telephoto ratio of the first lens unit L1. Then, the following expressions hold.

$$f1ab = f1a \cdot \beta 1b = f1/\beta 1c \quad (a\text{-}1)$$

$$f1c = \frac{(f1ab - e1abc) \times \beta 1c}{1 - \beta 1c} \quad (a\text{-}2)$$

$$K = \frac{f1 + e1ab \cdot (1 - \beta 1b \cdot \beta 1c) + e1bc \cdot (1 - \beta 1c)}{f1} \quad (a\text{-}3)$$

Let α1b and α1c represent angles of incidence of object paraxial rays. Also, let α1b' and α1c' represent angles of emergence of object paraxial rays. The following expressions relating to the image-forming magnifications β1b and β1c of the second lens subunit L1b and the third lens subunit L1c hold:

$$\beta 1b = \alpha 1b/\alpha 1b' < 1 \quad \text{(a-4)}$$

$$\beta 1c = \alpha 1c/\alpha 1c' < 1 \quad \text{(a-5)}$$

$$\alpha 1b' = \alpha 1c \quad \text{(a-6)}$$

To achieve miniaturization, it is useful to appropriately set the focal lengths f1ab and f1c so as to reduce the ratio K to a small value.

The conditional expression (1) defines the range of the ratio of the focal length f1c to the focal length f1ab. In a case where this ratio is lower than the lower limit of the ratio according to the conditional expression (1), the refractive power of the third lens subunit L1c is reduced, so that the image-forming magnifications β1c determined according to the expression (a-5) comes closer to 1. Consequently, the ratio K according to the expression (a-3) is increased. This is unfavorable for compactification of the zoom lens.

In a case where this ratio exceeds the upper limit of the ratio according to the conditional expression (1), the ratio K is reduced. This is favorable for the compactification. However, the refractive power of the third lens subunit L1c is increased. Thus, high-order aberration, especially, longitudinal chromatic aberration and high-order spherical aberration at a telephoto end occur in the third lens subunit L1c. It can be difficult to correct such aberration by another lens unit.

Additionally, the lower limit and the upper limit of the conditional expression (1) can be replaced with (−3.5) and (−1.5), respectively.

Figure 8:
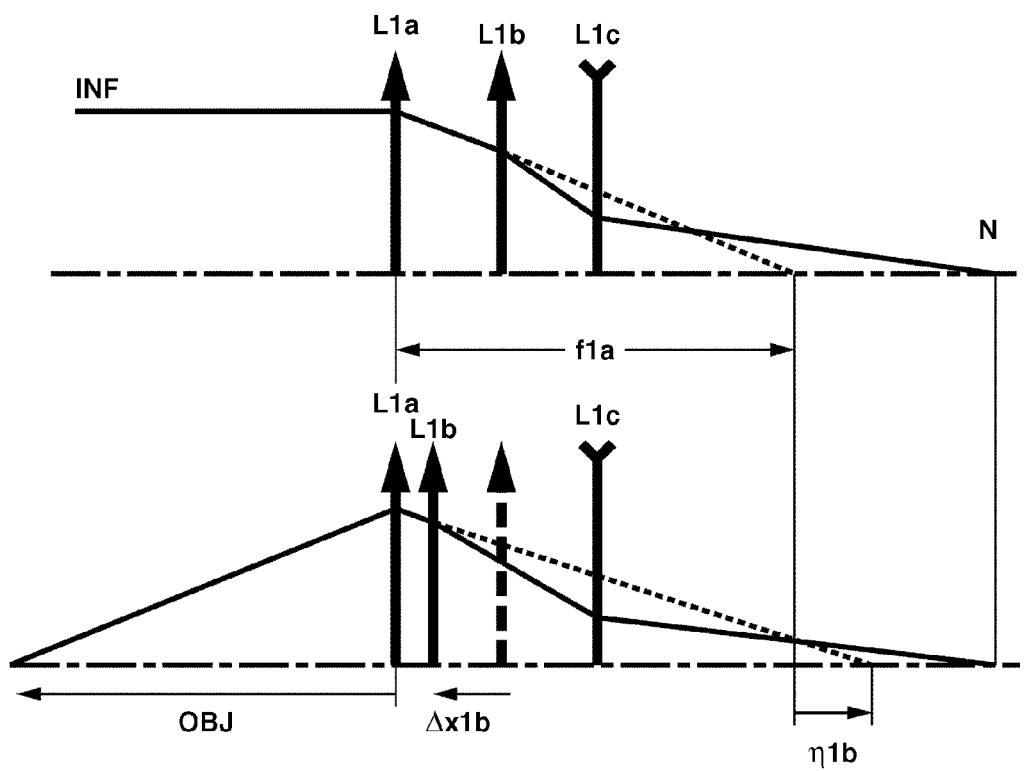
FIG. 8 is a schematic view illustrating a focusing operation of the first lens unit according to the exemplary embodiment of the present invention.

Referring next to FIG. 8, a focusing operation according to the present exemplary embodiment is schematically illustrated.

In the present exemplary embodiment, focusing is performed by moving the second lens subunit L1b along an optical axis. Let η1b and OBJ denote an amount of displacement of an object point of the second lens subunit L1b and a distance from an object to the position of a principal point of the first lens subunit L1a, respectively. An amount Δx1b of displacement of the second lens subunit L1b when focusing is performed at an infinite object distance is given by the following expression.

$$\Delta x 1b = p + \sqrt{p^2 - 4q} \quad \text{(b-1)}$$

$$P = \frac{(1 - \beta 1b^2)f1b}{\beta 1b^2} + \eta 1b \quad \text{(b-2)}$$

$$q = -\beta 1b \cdot f1b \cdot \eta 1b \quad \text{(b-3)}$$

$$\eta 1b = \frac{f1a^2}{OBJ + f1a} \quad \text{(b-4)}$$

Thus, both of reduction in the amount of movement due to focusing by the second lens subunit L1b and suppression of variation in various kinds of aberration due to focusing can be achieved by appropriately determining the focal lengths f1a and f1b. Also, both of reduction in a driving force in focusing and miniaturization of the entire drive mechanism can be achieved by driving only the second lens subunit L1b, which is a partial system of the first lens unit L1, along the optical axis.

The conditional expression (2) defines the ratio between the focal lengths f1a and f1b. In a case where the ratio (f1b/f1a) is lower than the lower limit of the conditional expression (2), the amount Δx1b of displacement can be reduced, while the refractive power of the second lens subunit L1b is increased. Thus, high-order aberration, especially, longitudinal chromatic aberration and high-order spherical aberration, which are caused by displacement due to focusing, at a telephoto end occur in the second lens subunit L1b. It can be difficult to suppress such aberration. Conversely, in a case where the ratio (f1b/f1a) exceeds the upper limit of the conditional expression (2), the amount Δx1b of displacement is increased according to the expressions (b-1) to (b-4). An air space required to move the second lens subunit is increased. This is unfavorable for the compactification.

Additionally, the lower limit and the upper limit of the conditional expression (2) can be replaced with 0.6 and 1.8, respectively.

The second lens subunit L1b has at least one positive lens element and at least one negative lens element whose object-side lens surface is convex toward an image side. In a case where the object distance is reduced, an angle α of inclination of an object paraxial ray is negative in the first lens subunit L1a. Thus, diverging rays are incident on the first lens subunit L1a. Subsequently, light rays emerging from the first lens subunit L1a converge. Change in the angle α of inclination causes negative spherical aberration. This is outstanding at a telephoto side and at a near distance side. As shown in FIG. 8, the second lens subunit L1b moves to the object side when focus is adjusted to the near distance side. In a case where a negative lens element, whose object-side surface is convex toward the image side, is disposed in the second lens subunit L1b, the height h of the object paraxial ray increases as the second lens subunit L1b moves to the object side. Thus, large positive spherical aberration occurs. Consequently, variation in spherical aberration at the telephoto end due to focusing can be suppressed.

The conditional expression (3) defines the difference between the average value of Abbe numbers of positive lens elements included in the second lens subunit L1b and the average value of Abbe numbers of negative lens elements included in the second lens subunit L1b. The second lens subunit L1b moves toward the object side when focus is adjusted to the near distance side, the height H of the object paraxial ray in the second lens subunit L1b increases. Therefore, to suppress variation in longitudinal chromatic aberration, it is useful to correct the longitudinal chromatic aberration in the second lens subunit L1b. Thus, a small dispersion positive lens element and a large dispersion negative lens element are disposed in the second lens subunit L1b. Consequently, the variation in the longitudinal chromatic aberration at the telephoto end, which is caused by focusing, can be suppressed by using the second lens subunit L1b as a positive achromatic lens unit. In a case where the difference in the average value of Abbe numbers between the positive lens element and the negative lens element in the second lens subunit L1b is lower than the lower limit of the conditional expression (3), effects of correcting the longitudinal chromatic aberration is insufficient. Thus, it can be difficult to suppress the variation in the longitudinal chromatic aberration due to focusing.

The conditional expression (4) defines a difference in the average value of refractive indices between the positive lens element and the negative lens element included in the second lens subunit L1b. One can more largely suppress variation in spherical aberration due to focusing by setting the refractive index of the negative lens element at a high value. In a case where the difference in the average value of refractive indices therebetween is lower than the lower limit of the conditional expression (4), an effect of correcting the spherical aberration at the telephoto end is insufficient. Thus, it can be difficult to suppress the variation in the spherical aberration due to focusing.

The conditional expression (5) defines the ratio of the focal length of the first lens unit L1 to the focal length of the entire zoom lens at the telephoto end. In a case where the focal length of the first lens unit L1 is decreased to be lower than the lower limit of the conditional expression (5), it is favorable for achieving high magnification. However, it can be difficult to enhance telephoto ability. Conversely, in case where the ratio of the focal length of the first lens unit L1 to the focal length of the entire zoom lens at the telephoto end exceeds the upper limit of the conditional expression (5), the telephoto ability can easily be enhanced. However, a distance of the object point to the second lens unit L2 increases, so that the amount of displacement of the second lens unit L2 increases. This is unfavorable for the compactification of the zoom lens.

Additionally, the lower limit and the upper limit of the conditional expression (5) can be replaced with 0.25 and 0.7, respectively.

The conditional expressions (6) and (7) define specifications of the zoom lens to which the conditions (1) and (2) are very effectively applied.

The conditional expression (8) defines a ratio of the distance between the first lens subunit L1a and the rear focal position of the first lens unit L1 to the focal length of the first lens unit L1 (hereunder referred to simply as a telephoto ratio of the first lens unit L1). In a case where the telephoto ratio of the first lens unit L1 exceeds the upper limit of the conditional expression (8), this is unfavorable for the compactification. Conversely, in a case where the telephoto ratio of the first lens unit L1 is lower than the lower limit of the conditional expression (8), the refractive power of the third lens subunit L1c is too high. Thus, unfavorably, it can be difficult to enhance the performance.

The conditional expression (9) defines conditions for favorably correcting the longitudinal chromatic aberration at the telephoto end. The focal length of the zoom lens according to the present exemplary embodiment is relatively long. Especially, the longitudinal chromatic aberration at the telephoto end is problematic to the driving device. The longitudinal chromatic aberration caused in the first lens subunit L1a is enlarged in proportional to the square of the image-forming magnification of a part including the second lens subunit L1b and components subsequent thereto. Thus, it is useful to favorably correct the chromatic aberration in the first lens subunit L1a.

To correct the longitudinal chromatic aberration in the first lens subunit L1a while maintaining appropriate positive refractive power, it can be insufficient to constitute the first lens subunit L1a by one positive lens element and one negative lens element. The longitudinal chromatic aberration at the telephoto end can favorably be corrected by configuring the first lens subunit L1a to include at least two positive lens elements, and by selecting a low-dispersion material as the material of the positive lens elements.

Thus, the conditional expressions (9) define the lower limit of the difference between the average value of Abbe numbers of positive lens elements included in the first lens subunit L1a and the average value of Abbe numbers of negative lens elements included in the first lens subunit L1a. In a case where the difference between the average values of Abbe numbers of the positive lens element and the negative lens element included in the first lens subunit L1a is lower than the lower limit of the expression (9), the longitudinal chromatic aberration in the first lens subunit L1a is large at the telephoto end. It can be difficult to correct such aberration by another lens unit. Also, the number of lens elements is increased to correct chromatic aberration, and the curvature of each of the lens elements in the first lens subunits L1a increases, so that other kinds of aberration increase. This is unfavorable.

The conditional expression (10) defines the lower limit of the difference between the average value of Abbe numbers of positive lens elements included in the third lens subunit L1c and the average value of Abbe numbers of negative lens elements included in the third lens subunit L1c to favorably correct the longitudinal chromatic aberration at the telephoto end. In a case where the difference between the average value of Abbe numbers of the positive lens elements and the average value of Abbe numbers of the negative lens elements is lower than the lower limit, effects of correcting the longitudinal chromatic aberration generated in the first lens subunit L1a and the second lens subunit L1b at the telephoto end are insufficient. This is unfavorable. Also, the number of lens elements is increased to correct chromatic aberration, and the curvature of each of the lens elements in the third lens subunit L1c increases, so that other kinds of aberration increase. This is unfavorable.

As shown in FIG. 1, a focal length conversion optical system (an extender, EX) can be provided insertably into and removably from a space S formed in the fourth lens unit L4 of the zoom lens according to the present exemplary embodiment.

Figure 2:
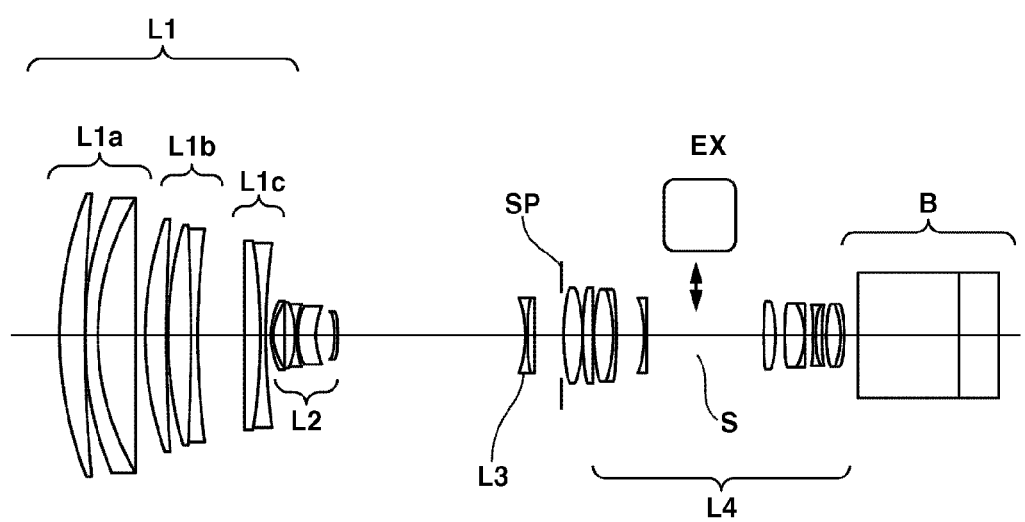
FIG. 2 is a cross-sectional view of the zoom lens according to the exemplary embodiment (numerical example 1) of the present invention at an object distance of 2.5 m at the wide-angle end.

FIG. 1 is a cross-sectional view of a zoom lens according to an exemplary embodiment (numerical example 1) of the present invention at the wide-angle end when focusing is performed at an infinite object distance. FIG. 2 is a cross-sectional view of the zoom lens at an object distance of 2.5 m at the wide-angle end.

Figure 3:
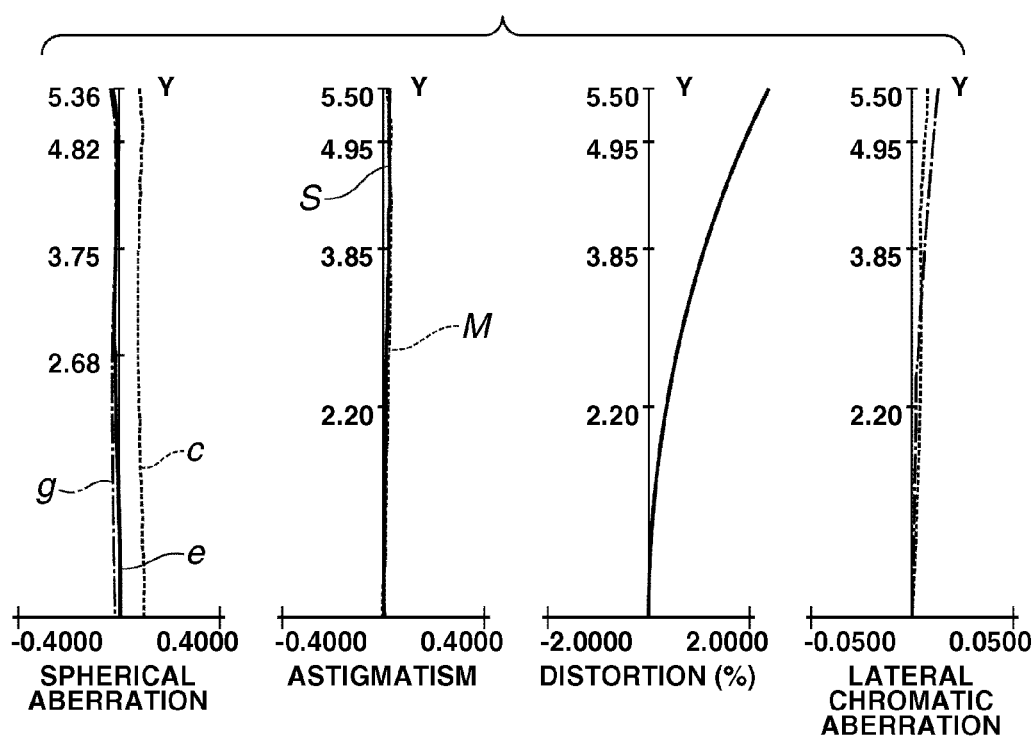
FIG. 3 shows aberration diagrams of the zoom lens according to the exemplary embodiment (numerical example 1) of the present invention at the wide-angle end.
Figure 4:
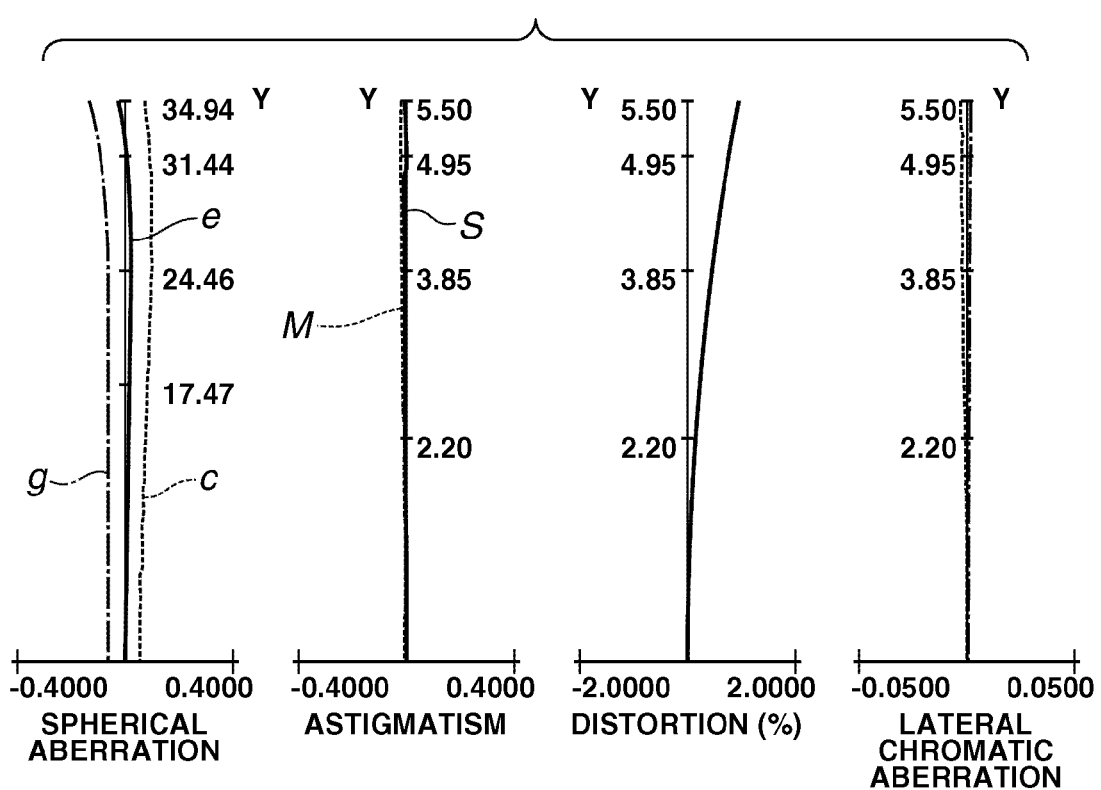
FIG. 4 shows aberration diagrams of the zoom lens according to the exemplary embodiment (numerical example 1) of the present invention at a focal length of 225 mm.
Figure 5:
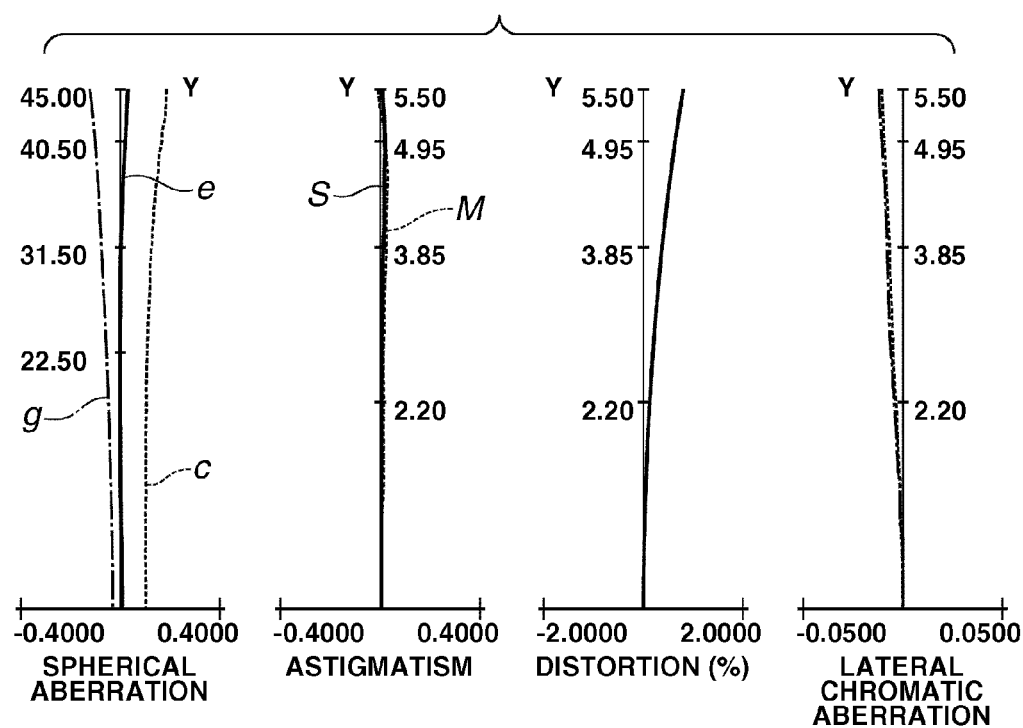
FIG. 5 shows aberration diagrams of the zoom lens according to the exemplary embodiment (numerical example 1) of the present invention at a telephoto end.
Figure 6:
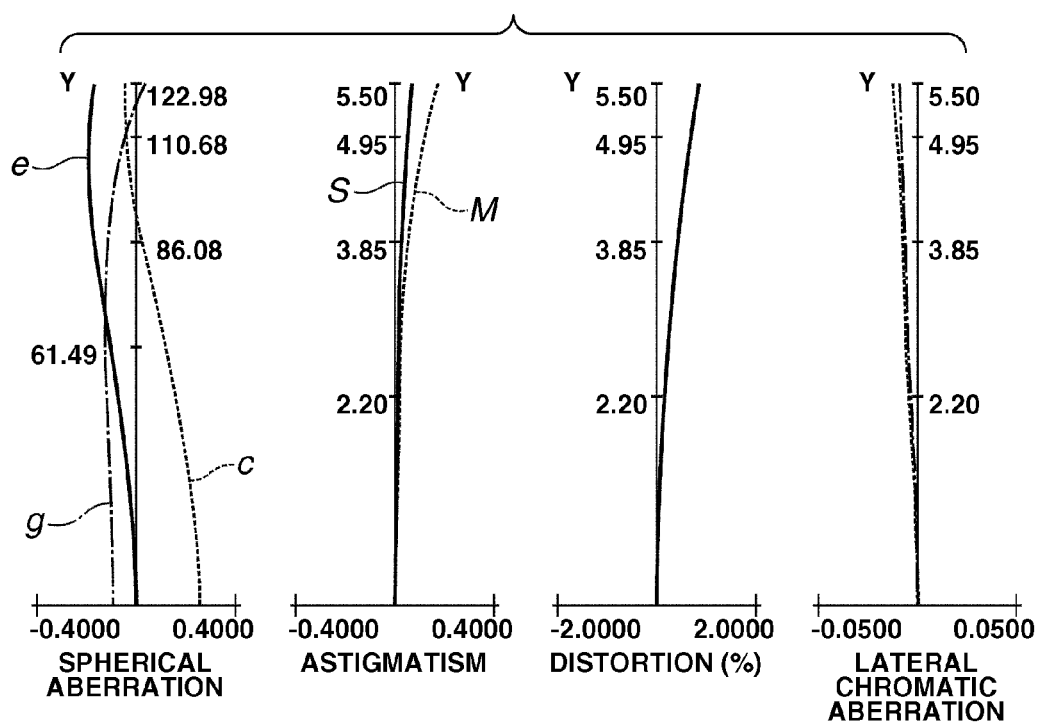
FIG. 6 shows aberration diagrams of the zoom lens according to the exemplary embodiment (numerical example 1) of the present invention at an object distance of 2.5 m at the telephoto end.

FIGS. 3 to 5 show aberration diagrams of the zoom lens according to the numerical example 1 of the present invention at the wide-angle end, at a middle position f=225 mm, and at the telephoto end. FIG. 6 shows aberration diagrams of the zoom lens according to the numerical example 1 of the present invention at an object distance of 2.5 m at the telephoto end. In each of the aberration diagrams, reference character e designates aberration corresponding to the e-line, which is represented by a solid line, reference character g designates aberration corresponding to the g-line, which is represented by a dot-and-dash line, and reference character c designates aberration corresponding to the c-line, which is represented by a dotted line. Additionally, reference character S denotes aberration in a sagittal image plane, which is represented by a solid curve, and reference character M designates aberration in a meridional image plane, which is represented by a dotted line and the Y-axis in the spherical aberration's graph is entrance pupil radius, the Y-axis in the astigmatism's, distortion's and chromatic aberration of magnification's graphs is image height.

In FIG. 1, a focus lens unit (a front lens unit) L1 has positive refractive power and serves as the first lens unit. A variator lens unit L2 has negative refractive power and serves as the second lens unit for power variation. The variator lens unit L2 monotonously moves along the optical axis toward the image plane side to thereby perform zooming from the wide-angle end to the telephoto end. A compensator lens unit L3 has negative refractive power and serves as the third lens unit. The compensator lens unit L3 nonlinearly moves along the optical axis to draw a locus, which is convex toward the object side, in order to compensate for variation of an image plane, which is caused by zooming. The variator lens unit L2 and the compensator lens unit L3 constitute a power variation system.

Also, the zoom lens has a stop SP. A stationary relay lens unit L4 has positive refractive power and serves as the fourth lens unit. A glass block B is, for example, a color separation prism, or an optical filter.

The first lens unit L1 includes, in order from an object side to the image side, a positive first lens subunit L1a, a positive second lens subunit L1b, and a negative third lens subunit L1c. The first lens subunit L1a includes two positive lens elements and one negative lens element. The second lens subunit L1b includes one positive lens element and a cemented lens including one positive lens element and one negative lens element. The third lens subunit L1c includes a cemented lens including one positive lens element and one negative lens element.

The present exemplary embodiment is configured such that the focal length at the telephoto end is about 450 mm, that the amount of displacement of the variator lens unit L2 between the wide-angle end and the telephoto end is about 58.297 mm, and that the variable power ratio is about 15. Thus, super-telephoto capability, miniaturization, and high-magnification can be achieved. According to the present exemplary embodiment, the following value of the ratio (f1c/f1ab) satisfies the conditional expression (1) to thereby achieve the miniaturization of the zoom lens.

$$f1c/f1ab = -2.5225 \quad (1)$$

Also, the following value of the ratio (f1b/f1a) satisfies the conditional expression (2) to thereby achieve both of reduction in the amount of displacement due to focusing and correction of spherical aberration.

$$f1b/f1a = 1.3543 \quad (2)$$

At an object distance of about 2.5 m, the second lens subunit L2 is moved to the object side so that the amount of displacement thereof is about 7.523 mm.

Also, the following values of the differences (vbp−vbn) and (Nbn−Nbp) satisfy the conditional expressions (3) and (4) to thereby correct variation in the longitudinal chromatic aberration and the spherical aberration due to focusing.

$$vbp-vbn = 53.62 \quad (3)$$

$$Nbn-Nbp = 0.2550 \quad (4)$$

Also, the following value of the ratio (f1/fT) satisfies the conditional expression (5) to thereby achieve both of the telephoto capability and the high magnification.

$$f1/fT = 0.3231 \quad (5)$$

Also, the following values of the ratio (fT/Ld) and the zoom ratio Z satisfy the conditional expressions (6) and (7).

$$fT/Ld = 40.9020 \quad (6)$$

$$Z = 15 \quad (7)$$

Also, the following value of the ratio K satisfies the conditional expression (8) to thereby achieve the miniaturization of the zoom lens.

$$K = 0.9676 \quad (8)$$

Also, the following values of the differences (vap−van) and (vcn−vcp) satisfy the conditional expressions (9) and (10) to thereby favorably correct the longitudinal chromatic aberration at the telephoto end.

$$vap-van = 47.81 \quad (9)$$

$$vcn-vcp = 11.94 \quad (10)$$

Table 1 shows lens configuration data according to the present exemplary embodiment (numerical example 1). In Table 1, ri represents a radius of curvature of an i-th lens surface from an object side. Also, di designates a space (including an air space) between an i-th lens surface and an (i+1)-th lens surface. Additionally, ni and vi denote the refractive index and the Abbe number of a material of an i-th lens element. A value of 0.000 of ri means an infinite number.

TABLE 1

| Numerical Example 1 | | | |
|---|---|---|---|
| r1 = 124.0884 | d1 = 8.07277 | n1 = 1.48749 | v1 = 70.23 |
| r2 = 429.7561 | d2 = 0.15 | | |
| r3 = 120.4975 | d3 = 4 | n2 = 1.720467 | v2 = 34.7 |
| r4 = 85.11712 | d4 = 12.88861 | n3 = 1.43875 | v3 = 94.99 |
| r5 = −7623.63 | d5 = 9.99782 | | |
| r6 = 114.6087 | d6 = 6.92112 | n4 = 1.43387 | v4 = 95.1 |
| r7 = 483.1968 | d7 = 0.42209 | | |
| r8 = 128.4188 | d8 = 7.8054 | n5 = 1.496999 | v5 = 81.54 |
| r9 = −935.217 | d9 = 2.5 | n6 = 1.720467 | v6 = 34.7 |
| r10 = 284.641 | d10 = 7.7722 | | |
| r11 = −7557.21 | d11 = 4.81999 | n7 = 1.808095 | v7 = 22.76 |
| r12 = −232.091 | d12 = 2.2 | n8 = 1.720467 | v8 = 34.7 |
| r13 = 185.4863 | d13 = Variable | | |
| r14 = 24.28535 | d14 = 1 | n9 = 1.882997 | v9 = 40.76 |
| r15 = 16.73433 | d15 = 3.18699 | | |
| r16 = 198.221 | d16 = 3.64678 | n10 = 1.808095 | v10 = 22.76 |
| r17 = −26.573 | d17 = 0.9 | n11 = 1.882997 | v11 = 40.76 |
| r18 = 40.79971 | d18 = 0.16833 | | |
| r19 = 21.11233 | d19 = 6.12039 | n12 = 1.808095 | v12 = 22.76 |
| r20 = 25.63884 | d20 = 5.7005 | | |
| r21 = −25.6226 | d21 = 0.9 | n13 = 1.882997 | v13 = 40.76 |
| r22 = −64.4601 | d22 = Variable | | |
| r23 = −43.5266 | d23 = 0.9 | n14 = 1.717004 | v14 = 47.92 |
| r24 = 78.00486 | d24 = 2.35438 | n15 = 1.84666 | v15 = 23.78 |
| r25 = −9430.14 | d25 = Variable | | |
| Stop 0 | d26 = 0.73867 | air | |
| r26 = 79.10065 | d27 = 6.22448 | n16 = 1.603112 | v16 = 60.64 |
| r27 = −48.912 | d28 = 0.15 | | |
| r28 = 88.16009 | d29 = 3.4451 | n17 = 1.620411 | v17 = 60.29 |
| r29 = −1822.04 | d30 = 0.15 | | |
| r30 = 65.66024 | d31 = 6.20192 | n18 = 1.48749 | v18 = 70.23 |
| r31 = −51.8818 | d32 = 1 | n19 = 1.800999 | v19 = 34.97 |
| r32 = −150.451 | d33 = 9.17259 | | |
| r33 = −41.2118 | d34 = 1 | n20 = 1.755199 | v20 = 27.51 |
| r34 = −290.757 | d35 = 38 | | |
| r35 = 180.865 | d36 = 3.81221 | n21 = 1.48749 | v21 = 70.23 |
| r36 = −35.7355 | d37 = 3.00612 | | |
| r37 = 47.35527 | d38 = 6.01246 | n22 = 1.496999 | v22 = 81.54 |
| r38 = −27.9414 | d39 = 0.8 | n23 = 1.882997 | v23 = 40.76 |
| r39 = −859.131 | d40 = 2.50345 | | |
| r40 = −76.5456 | d41 = 0.8 | n24 = 1.834807 | v24 = 42.72 |
| r41 = 34.01174 | d42 = 2.04025 | n25 = 1.48749 | v25 = 70.23 |
| r42 = 57.73819 | d43 = 1.5 | | |
| r43 = 42.00885 | d44 = 4.52013 | n26 = 1.698947 | v26 = 30.13 |
| r44 = −28.2853 | d45 = 1 | n27 = 1.806098 | v27 = 40.92 |
| r45 = −54.4484 | d46 = 5 | | |
| r46 = 0 | d47 = 33 | n28 = 1.60859 | v28 = 46.44 |
| r47 = 0 | d48 = 13.2 | n29 = 1.5168 | v29 = 64.17 |
| r48 = 0 | | | |

| | Focal Length | | |
|---|---|---|---|
| Variable Space | 80 | 225 | 450 |
| d13 | 1.145162 | 52.38752 | 59.44261 |
| d22 | 61.41239 | 3.264451 | 10.71238 |
| d25 | 9.067467 | 15.97305 | 1.470032 |

The zoom lens according to the present exemplary embodiment is replaceably mounted on an imaging apparatus, such as a television camera or a video camera. Next, an imaging system (e.g., a television camera system) using the zoom lens according to the present exemplary embodiment as an imaging optical system is described below with reference to FIG. 9.

Figure 9:
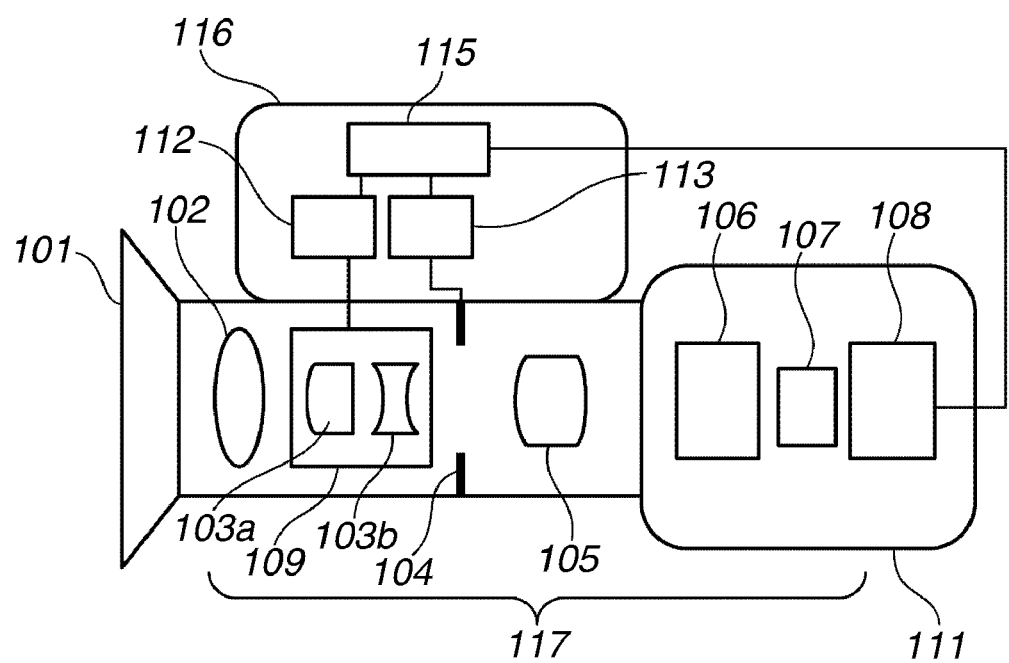
FIG. 9 is a schematic view of an imaging system using the zoom lens according to the exemplary embodiment of the present invention.

As shown in FIG. 9, an imaging system 117 includes a zoom lens 101 according to the present exemplary embodiment and a camera 111 serving as an imaging apparatus with the zoom lens 101 mounted thereon.

The zoom lens 101 includes a front lens unit (corresponding to the first lens unit) 102, a part of which is moved along the optical axis as a focus lens unit by a manual operation. The zoom lens 101 further includes a variator lens unit (corresponding to the second lens unit) 103a configured to move along the optical axis to perform zooming, a compensator lens unit (corresponding to the third lens unit) 103b configured to move along the optical axis to compensate for variation of an image plane, which is caused by zooming, a stop 104, and a stationary relay lens unit (corresponding to the fourth lens unit) 105.

A zoom mechanism member 109, such as a cam, is configured to mechanically control the positions of the lens units 103a and 103b, which move during zooming, along the optical axis and to enable a manual zoom operation.

The camera 111 includes a glass block 106, which corresponds to an optical filter or a color separation prism, and an image sensor (a photoelectric conversion element) 107, such as a CCD (charge-coupled device) sensor or a CMOS (complementary metal-oxide semiconductor) sensor, configured to receive light representing an image of an object, which is formed by the zoom lens 101. The camera 111 further includes a camera controller 111, such as a central processing unit (CPU), configured to control the camera 111.

A drive unit 116 is mounted on a side surface of the zoom lens 101. The drive unit 116 is equipped with various kinds of operation switches, such as a zoom switch and a stop changing-over switch, and serves as an interface between the zoom lens 101 and an operator. The drive unit 116 includes a zoom actuator 112, which is configured to drive the zoom mechanism member 109 to move the lens units 103a and 103b thereby to perform zooming. The drive unit 116 further includes a stop actuator 113, which is configured to drive the stop 104, and a drive unit controller 115, such as a CPU, configured to control the drive unit 116.

Although FIG. 9 shows the zoom lens of the type on which the drive unit 116 is mounted, exemplary embodiments of the present invention can be applied to a zoom lens of the type that incorporates a drive unit. Also, the zoom lens according to exemplary embodiments of the present invention can have an automatic focus function of performing focus detection and controlling the position of the focus lens unit 102.

In the foregoing description, refractive power of the lens units or the lens elements has been described. However, the present invention can be applied to a case where the lens units or the lens elements have optical power equivalent to refractive power due to refraction by a diffractive optical element attached to a lens surface.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-329888 filed Nov. 15, 2005, which is hereby incorporated by reference herein in its entirety.

What is claimed is:

1. A zoom lens comprising, in order from an object side to an image side;
   a first lens unit having positive refractive power, which is stationary during zooming;
   a second lens unit configured to move to perform zooming;
   a third lens unit configured to move to compensate for variation of an image plane caused by zooming; and
   a fourth lens unit having positive refractive power, which is stationary during zooming,
   wherein the first lens unit includes, in order from the object side to the image side, a first lens subunit having positive refractive power, which is stationary during focusing, a second lens subunit having positive refractive power, and a third lens subunit having negative refractive power, which is stationary during focusing,
   wherein the second lens subunit moves along an optical axis during focusing, and
   wherein the first lens unit satisfies the following conditions:

$-4.5 < f1c/f1ab < -0.8$ and $1 < f1b/f1a < 3.0$ where f1a designates a focal length of the first lens subunit, f1b represents a focal length of the second lens subunit, f1c denotes a focal length of the third lens subunit, and f1ab designates a combined focal length of the first lens subunit and the second lens subunit when focusing is performed at an infinite object distance.

2. A zoom lens comprising, in order from an object side to an image side:
   a first lens unit having positive refractive power, which is stationary during zooming;
   a second lens unit configured to move to perform zooming;
   a third lens unit configured to move to compensate for variation of an image plane caused by zooming; and
   a fourth lens unit having positive refractive power, which is stationary during zooming,
   wherein the first lens unit includes, in order from the object side to the image side, a first lens subunit having positive refractive power, which is stationary during focusing, a second lens subunit having positive refractive power, and a third lens subunit having negative refractive power, which is stationary during focusing,
   wherein the second lens subunit moves along an optical axis during focusing, and
   wherein the first lens unit satisfies the following conditions:

$vbp - vbn > 30$, where vbp designates an average value of Abbe numbers of the at least one positive lens element included in the second lens subunit, and vbn represents an average value of Abbe numbers of the at least one negative tens element included in the second lens subunit.

3. A zoom lens comprising, in order from an object side to an image side:
   a first lens unit having positive refractive power, which is stationary during zooming;
   a second lens unit configured to move to perform zooming;
   a third lens unit configured to move to compensate for variation of an image plane caused by zooming; and a fourth lens unit having positive refractive power, which is stationary during zooming, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, and wherein the second lens subunit moves along an optical axis during focusing, wherein the second lens subunit includes at least one positive lens element and at least one negative lens element whose object-side surface is convex toward the image side, and wherein the second lens subunit satisfies the following conditions:

$Nbn-Nbp>0.1$, where Nbp designates an average value of refractive indices of the at least one positive lens element included in the second lens subunit, and Nbn represents an average value of refractive indices of the at least one negative lens element included in the second lens subunit.

4. A zoom lens comprising, in order from an object side to an image side: a first lens unit having positive refractive power, which is stationary during zooming;

a second lens unit configured to move to perform zooming;

a third lens unit configured to move to compensate for variation of an image plane caused by zooming; and a fourth lens unit having positive refractive power, which is stationary during zooming, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, wherein the second lens subunit moves along an optical axis during focusing, and wherein the zoom lens satisfies the following condition:

$0.2 < f1/fT < 0.8$, where f1 designates a focal length of the first lens unit, and fT represents a focal length of the zoom lens at a telephoto end.

5. A zoom lens comprising, in order from an object side to an image side:

a first lens unit having positive refractive power, which is stationary during zooming;

a second lens unit configured to move to perform zooming;

a third lens unit configured to move to compensate for variation of an image plane caused by zooming; and a fourth lens unit having positive refractive power, which is stationary during zooming, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, wherein the second lens subunit moves along an optical axis during focusing, and wherein the zoom lens satisfies the following condition:

$30 < fT/Ld$, and $5 < Z$ where fT represents a focal length of the zoom lens at a telephoto end, Ld designates a diagonal length of an effective image plane formed by the zoom lens, and Z denotes a zoom ratio of the zoom lens.

6. A zoom lens comprising, in order from an object side to an image side:

a first lens unit having positive refractive power, which is stationary during zooming;

a second lens unit configured to move to perform zooming;

a third lens unit configured to move to compensate for variation of an image plane caused by zooming; and a fourth lens unit having positive refractive power, which is stationary during zooming, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, wherein the second lens subunit moves along an optical axis during focusing. and wherein the zoom lens satisfies the following condition:

$0.6 < K < 1.3$, where K designates a ratio of a distance $\Delta 1$ between a rear focal position of the first lens subunit and a rear focal position of the first lens unit to a focal length f1 of the first lens unit.

7. A zoom lens comprising, in order from an object side to an image side:

a first lens unit having positive refractive power, which is stationary during zooming;

a second lens unit configured to move to perform zooming;

a third lens unit configured to move to compensate for variation of an image plane caused by zooming; and a fourth lens unit having positive refractive power, which is stationary during zooming, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, wherein the second lens subunit moves along an optical axis during focusing, and wherein the first lens subunit includes at least two positive lens elements and at least one negative lens element, said zoom lens satisfying the following condition:

$vap - van > 30$, where vap designates an average value of Abbe numbers of the at least two positive lens elements included in the first lens subunit, and van represents an average value of Abbe numbers of the at least one negative lens element included in the first lens subunit.

8. A zoom lens comprising, in order from an object side to an image side:

a first lens unit having positive refractive power, which is stationary during zooming;

a second lens unit configured to move to perform zooming;

a third lens unit configured to move to compensate for variation of an image plane caused by zooming; and a fourth lens unit having positive refractive power, which is stationary during zooming, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, wherein the second lens subunit moves along an optical axis during focusing, and wherein the third lens subunit includes at least one positive lens element and at least one negative lens element, said zoom lens satisfying the following condition:

$$\nu en - \nu ep > 5,$$

where vep designates an average value of Abbe numbers of the at least one positive lens element included in the third lens subunit, and ven represents an average value of Abbe numbers of the at least one negative lens element included in the third lens subunit.

9. A zoom lens comprising, in order from an object side to an image side:

a first lens unit having positive refractive power, which is stationary during zooming;

a second lens unit configured to move to perform zooming;

a third lens unit configured to move to compensate for variation of an image plane caused by zooming;

a fourth lens unit having positive refractive power, which is stationary during zooming; and a stop disposed between the third lens unit and the fourth lens unit, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, and wherein the second lens subunit moves along an optical axis during focusing.

10. A zoom lens comprising, in order from an object side to an image side:

a first lens unit having positive refractive power, which is stationary during zooming:

a second lens unit configured to move to perform zooming;

a third lens unit configured to move to compensate for variation of an image plane caused by zooming;

a fourth lens unit having positive refractive power, which is stationary during zooming; and a focal length conversion optical system insertable into and removable from a space formed in the fourth lens unit, wherein the first lens unit includes, in order from the object side to the image side, a first lens subunit having positive refractive power, which is stationary during focusing, a second lens subunit having positive refractive power, and a third lens subunit having negative refractive power, which is stationary during focusing, and wherein the second lens subunit moves along an optical axis during focusing.

11. The zoom lens according to claim 1, further in combination with an imaging apparatus, wherein the imaging apparatus is adapted to mountably receive the zoom lens thereon.

12. The zoom lens according to claim 2, further in combination with an imaging apparatus, wherein the imaging apparatus is adapted to mountably receive the zoom lens thereon.

13. The zoom lens according to claim 3, further in combination with an imaging apparatus, wherein the imaging apparatus is adapted to mountably receive the zoom lens thereon.

14. The zoom lens according to claim 4, further in combination with an imaging apparatus, wherein the imaging apparatus is adapted to mountably receive the zoom lens thereon.

15. The zoom lens according to claim 5, further in combination with an imaging apparatus, wherein the imaging apparatus is adapted to mountably receive the zoom lens thereon.

16. The zoom lens according to claim 6, further in combination with an imaging apparatus, wherein the imaging apparatus is adapted to mountably receive the zoom lens thereon.

17. The zoom lens according to claim 7, further in combination with an imaging apparatus, wherein the imaging apparatus is adapted to mountably receive the zoom lens thereon.

18. The zoom lens according to claim 8, further in combination with an imaging apparatus, wherein the imaging apparatus is adapted to mountably receive the zoom lens thereon.

19. The zoom lens according to claim 9, further in combination with an imaging apparatus, wherein the imaging apparatus is adapted to mountably receive the zoom lens thereon.

20. The zoom lens according to claim 10, further in combination with an imaging apparatus, wherein the imaging apparatus is adapted to mountably receive the zoom lens thereon.

* * * * *